US008335843B2

(12) United States Patent
Fujimori et al.

(10) Patent No.: US 8,335,843 B2
(45) Date of Patent: Dec. 18, 2012

(54) COMMUNICATION SYSTEM HAVING MULTIPLE COMMUNICATION LINES BETWEEN A TRANSMITTER AND A RECEIVER

(75) Inventors: Takafumi Fujimori, Kawasaki (JP); Youichi Yuda, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 1325 days.

(21) Appl. No.: 11/104,546

(22) Filed: Apr. 13, 2005

(65) Prior Publication Data

US 2006/0195594 A1 Aug. 31, 2006

(30) Foreign Application Priority Data

Dec. 22, 2004 (JP) .................................. 2004-371468

(51) Int. Cl.
G06F 15/173 (2006.01)
(52) U.S. Cl. ....................................................... 709/223
(58) Field of Classification Search .................. 709/223, 709/202, 230, 232, 238–239; 370/259, 351, 370/465
See application file for complete search history.

(56) References Cited

U.S. PATENT DOCUMENTS

| | | | |
|---|---|---|---|
| 4,780,869 A | | 10/1988 | Engdahl et al. |
| 5,471,617 A | * | 11/1995 | Farrand et al. ................. 718/100 |
| 5,561,769 A | * | 10/1996 | Kumar et al. ................. 709/202 |
| 6,385,197 B1 | * | 5/2002 | Sugihara ........................ 370/380 |
| 6,404,743 B1 | * | 6/2002 | Meandzija ..................... 370/254 |
| 6,671,821 B1 | * | 12/2003 | Castro et al. ....................... 714/4 |
| 6,850,524 B1 | * | 2/2005 | Troxel et al. ............. 370/395.32 |
| 6,970,939 B2 | * | 11/2005 | Sim ................................. 709/236 |
| 7,301,448 B1 | * | 11/2007 | Usery et al. .................... 340/506 |
| 7,590,635 B2 | * | 9/2009 | Hillis et al. ............................ 1/1 |
| 2002/0075873 A1 | * | 6/2002 | Lindhorst-Ko et al. ........ 370/394 |
| 2002/0120730 A1 | * | 8/2002 | Goudzwaard et al. ........ 709/223 |
| 2003/0126199 A1 | * | 7/2003 | Kadri et al. .................... 709/203 |
| 2003/0142666 A1 | * | 7/2003 | Bonney et al. ................. 370/389 |

FOREIGN PATENT DOCUMENTS

| | | |
|---|---|---|
| EP | 0 854 610 A2 | 7/1998 |
| JP | 2000-69119 | 3/2000 |
| JP | 2001-67291 | 3/2001 |
| JP | 2001-217754 A | 8/2001 |
| JP | 2001217754 A * | 8/2001 |
| JP | 2002-31486 A | 10/2002 |
| JP | 2003-244142 A | 8/2003 |
| JP | 2004-012599 A | 1/2004 |

OTHER PUBLICATIONS

Case et al., "A Simple Network Management Protocol (SNMP)" [online], May 1990 [retrieved on Oct. 2, 2008], Network Computing Group, RFC 1157, [Retrieved from: http://www.faqs.org/ftp/rfc/pdf/rfc1157.txt.pdf] pp. 1-2 and 27-28.*

(Continued)

*Primary Examiner* — Philip Chea
*Assistant Examiner* — Eric W Shepperd
(74) *Attorney, Agent, or Firm* — Fujitsu Patent Center

(57) ABSTRACT

In a communication system using UDP, multiple communication lines are provided between a transmitter and a receiver, and the transmitter transmits communication data to the multiple communication lines in parallel, and the receiver is provided with facilities for receiving the transmitted communication data without excess or deficiency to enable communication data to be smoothly received at a low cost without a loss and without an excess load to the process of the receiver.

7 Claims, 10 Drawing Sheets

OTHER PUBLICATIONS

Nobutaka et al, "JP2001-217754: Communication System" [Online Machine Translation], Aug. 10, 2001 [Retrieved on: Jan. 1, 2011], Advanced Industrial Property Network (AIPN) [Retrieved from: http://dossier1.ipdl.inpit.go.jp/AIPN/odse_call_transl.ipdl?N0000=7413&N0005=Ei7BzenZVnBvfz7D1ZIK&N0120=01&N2001=2&N3001=2001-217754&Ntt3=computerV13&Ntt4=gakujutsuV13&Ntt5=electronicsV13&Ntt6=&Ntt7=&Ntt8=&Ntt9=&Ntt10=&Ntt11=&Ntt12= ].*

European Patent Office Communication, mailed Feb. 16, 2007, and issued in corresponding European Patent Application No. 05 251 688.7-1244.

European Search Report for European Application No. 05251688.7-2413 mailed Nov. 3, 2005.

"Chinese official communication", Application. No. 200510059703.2, dated Sep. 5, 2008.

"Japanese Office Action", mailed by JPO and corresponding to Japanese application No. 2004-371468 on Apr. 6, 2010, with partial English translation.

"Japanese Office Action", mailed Jul. 21, 2009 in corresponding JP Patent Appln. No. 2004-371468, Partial English Translation.

* cited by examiner

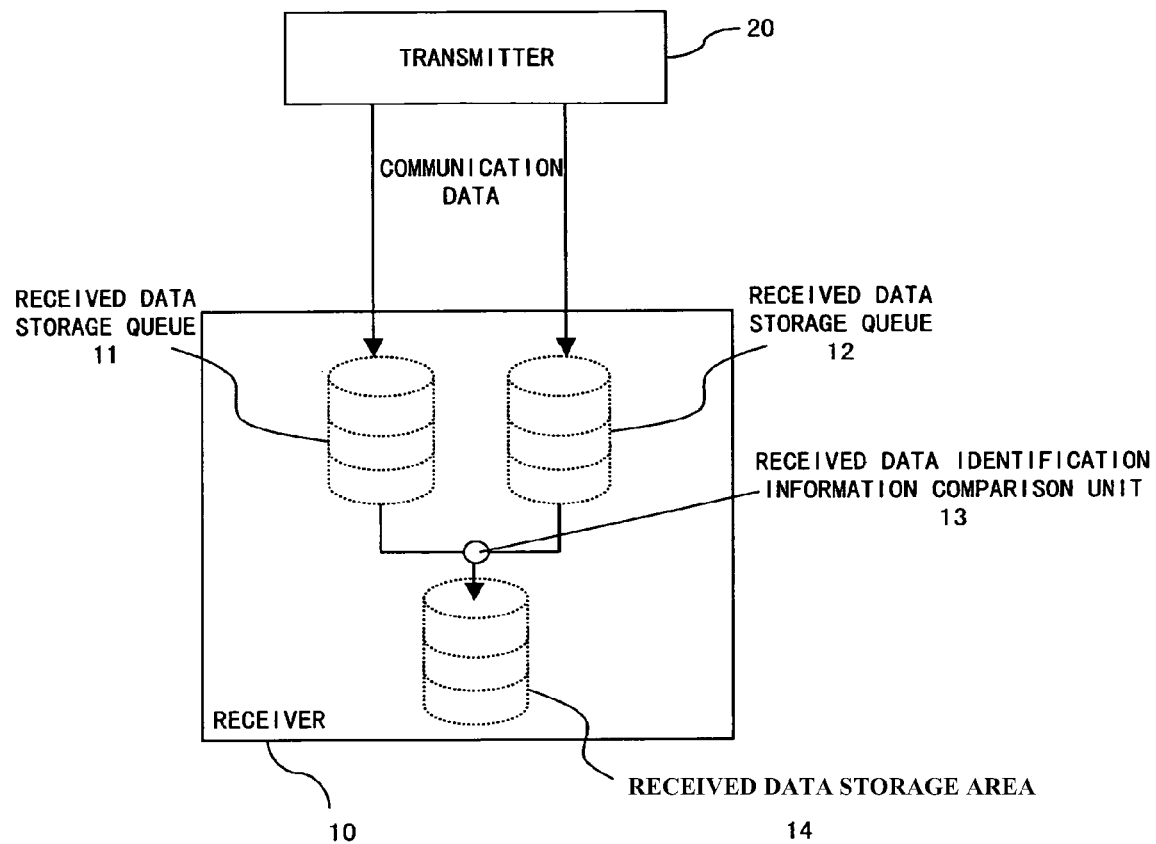
F I G. 3

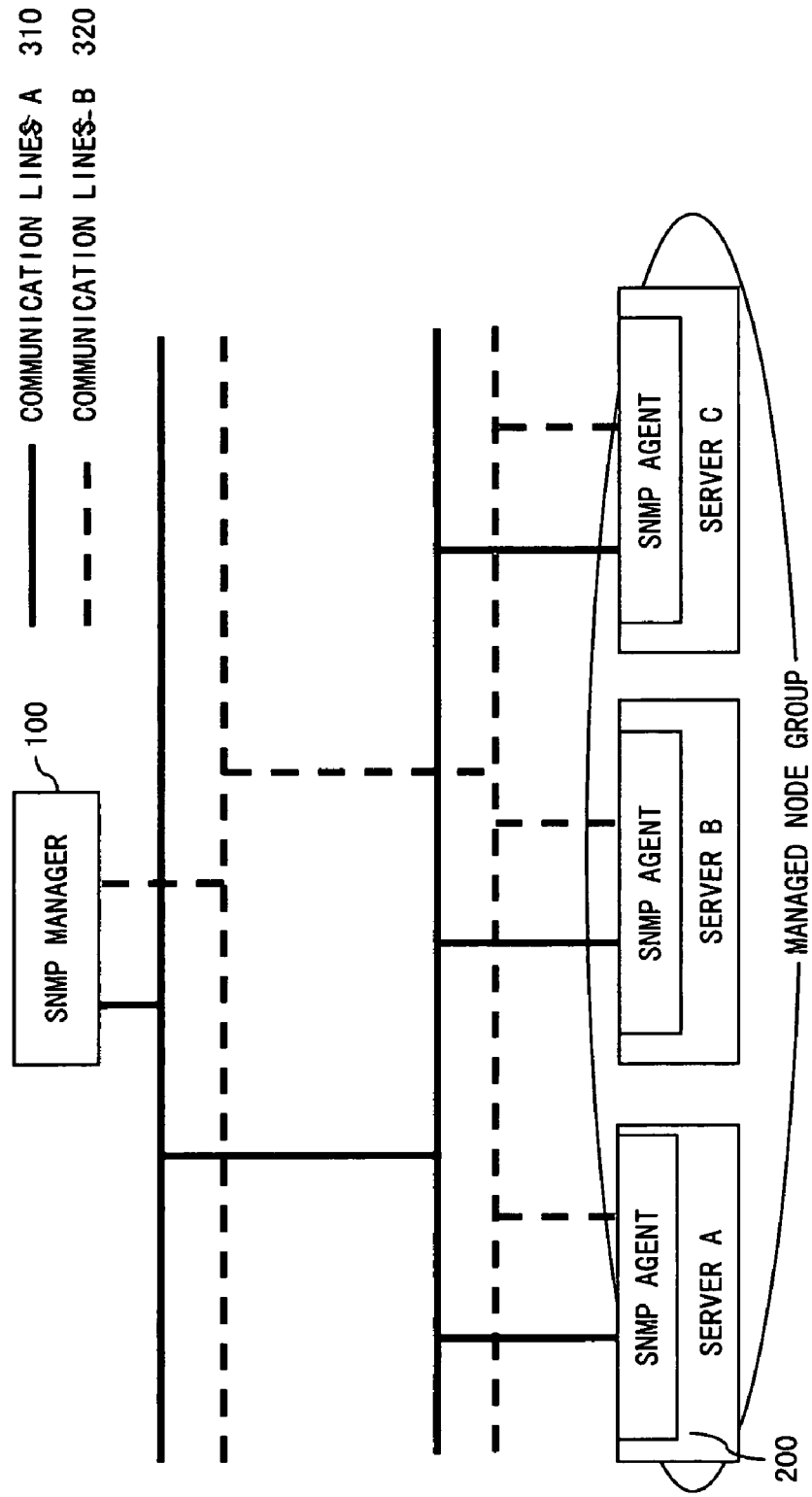
F I G. 4

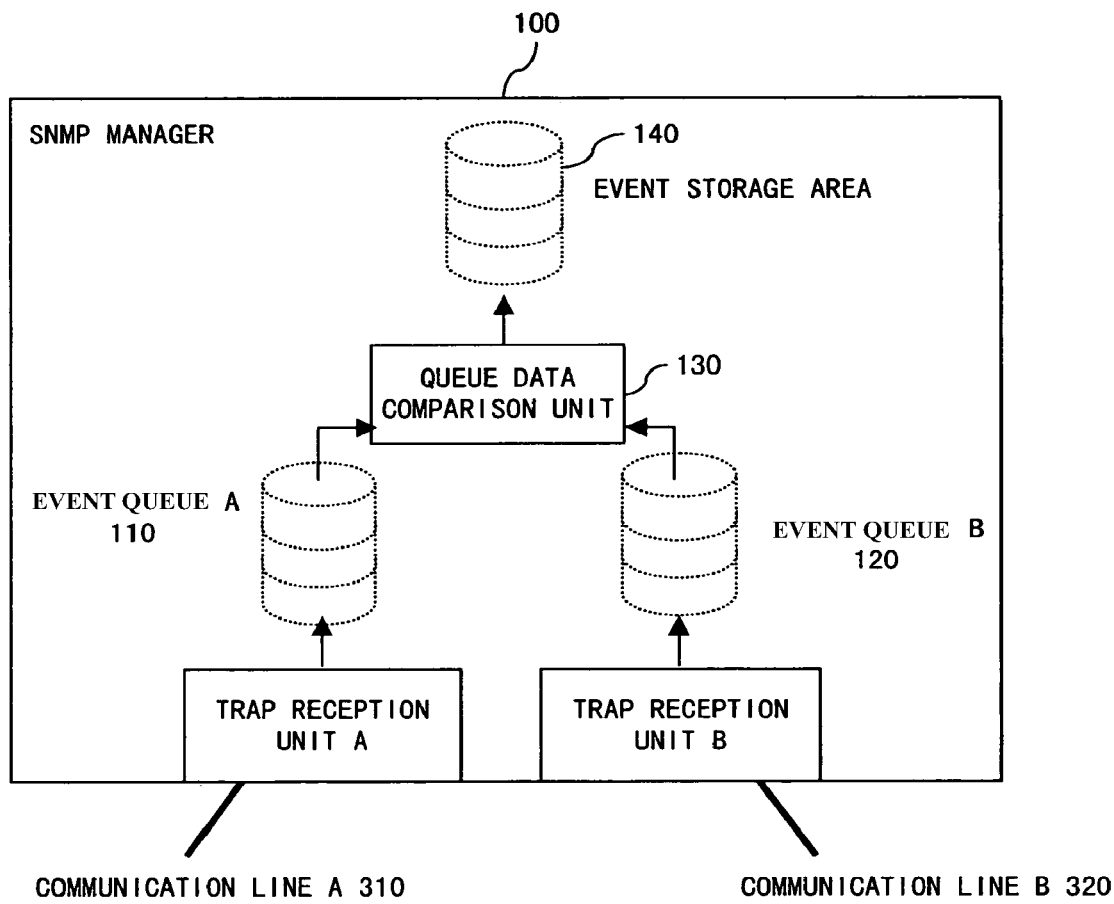
F I G. 5

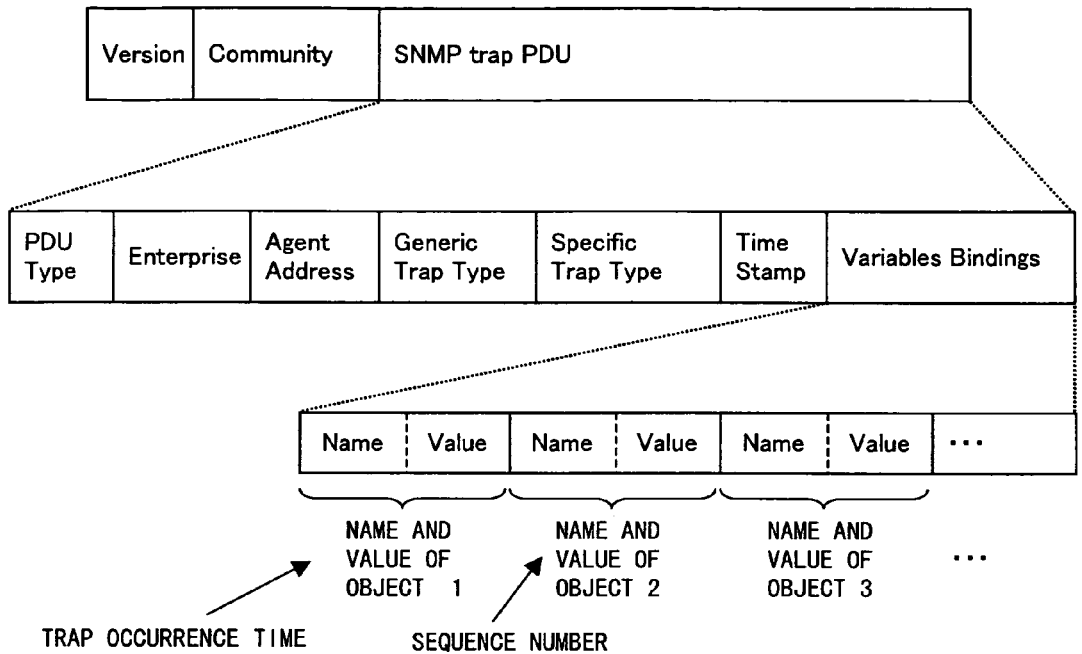

| Version | Community | SNMP trap PDU |

| PDU Type | Enterprise | Agent Address | Generic Trap Type | Specific Trap Type | Time Stamp | Variables Bindings |

| Name | Value | Name | Value | Name | Value | ... |

NAME AND VALUE OF OBJECT 1 ← TRAP OCCURRENCE TIME
NAME AND VALUE OF OBJECT 2 ← SEQUENCE NUMBER
NAME AND VALUE OF OBJECT 3

| | | |
|---|---|---|
| Version | : | SNMP PROTOCOL VERSION |
| Community | : | COMMUNITY TO BE ACCESSED |
| PDU Type | : | TYPE OF PDU |
| Enterprise | : | MANAGEMENT ENTERPRISE WHICH DEFINES TRAP |
| Agent Address | : | IP ADDRESS OF TRAP TRANSMITTER |
| Generic Trap Type | : | TYPE OF TRAP |
| Specific Trap Type | : | DETAILED CLASSIFICATION WHEN GENERIC TRAP TYPE IS ENTERPRISE SPECIFIC |
| Time Stamp | : | TIME PERIOD FROM AGENT INITIALIZATION TO TRAP GENERATION |
| Variables Binding | : | COMBINATION OF NAME (OBJECT ID) AND VALUE |

* IN EMBODIMENT OF THE PRESENT INVENTION, TRAP TRANSMITTER SETS TRAP OCCURRENCE TIME FOR OBJECT 1, AND SEQUENCE NUMBER FOR OBJECT 2, AND PERFORMS TRAP TRANSMISSION.

F I G. 6

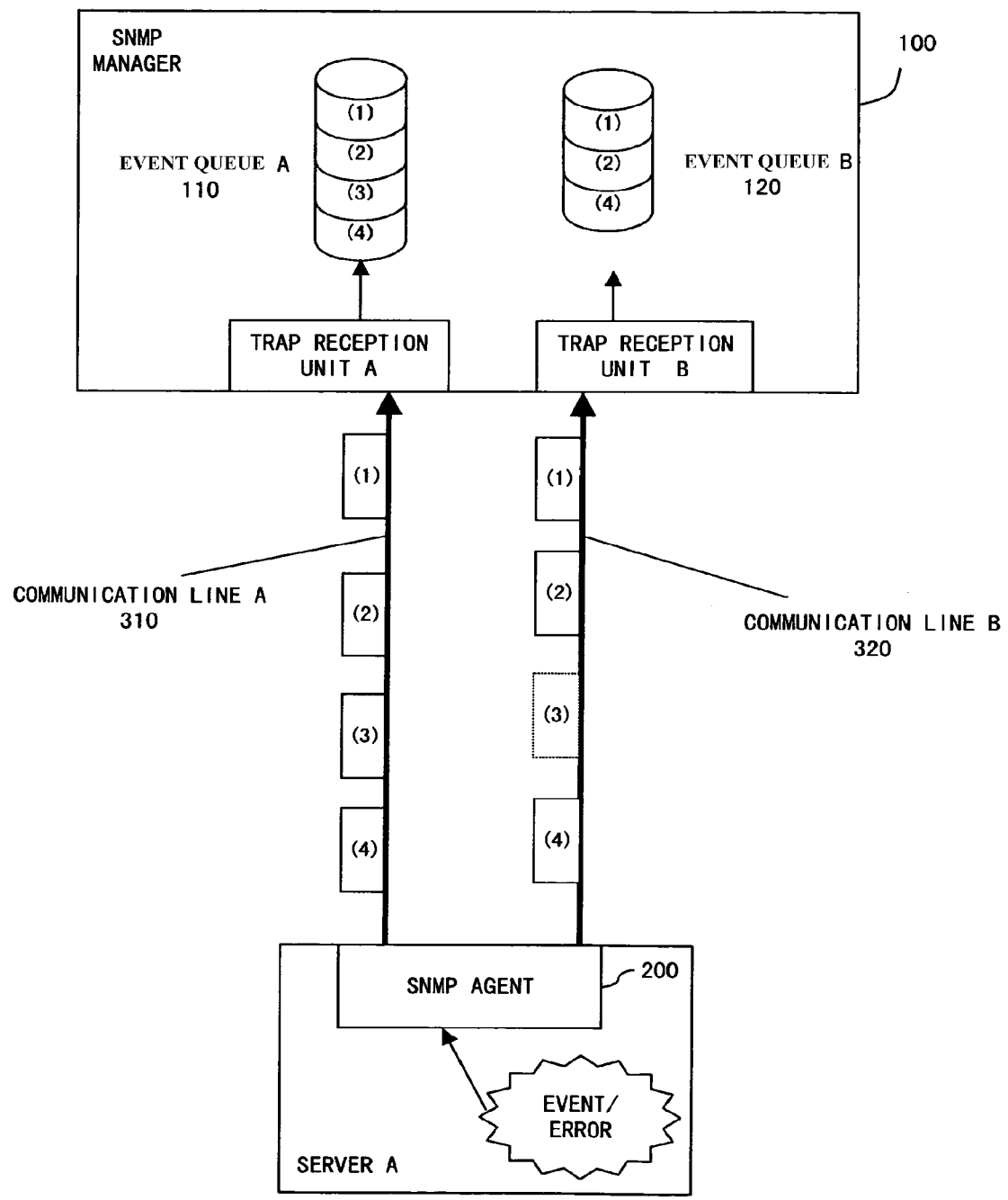
F I G. 7

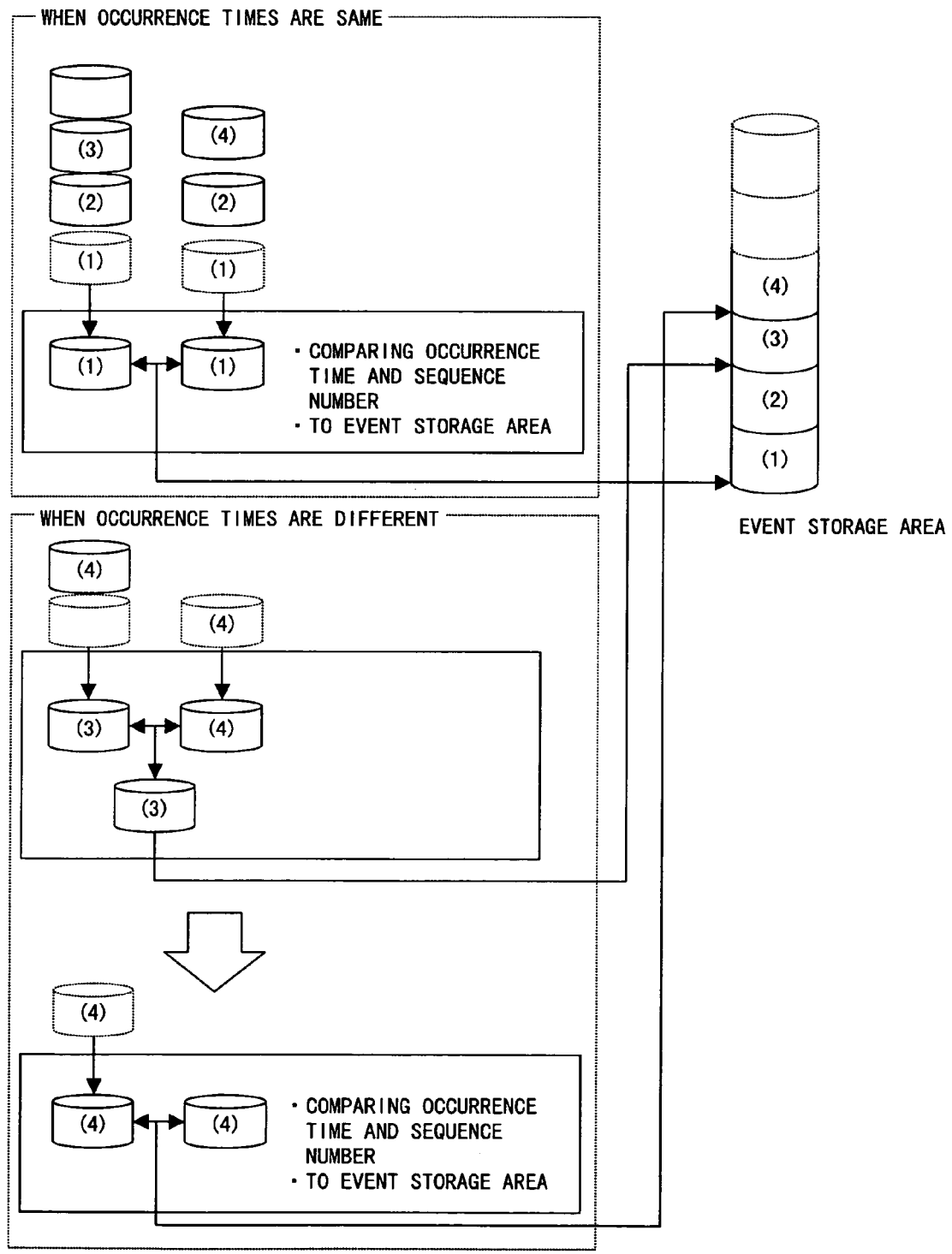
F I G. 8

COMMUNICATION SYSTEM HAVING MULTIPLE COMMUNICATION LINES BETWEEN A TRANSMITTER AND A RECEIVER

FIELD OF THE INVENTION

The present invention relates to a communication system using UDP (the User Datagram Protocol), and more specifically to a communication system applicable to the communication and data processing of the SNMP (the Simple Network Management Protocol) trap using UDP as a protocol of the transport layer.

DESCRIPTION OF THE RELATED ART

UDP (the User Datagram Protocol) is standardized as a protocol for the transport layer of the OSI reference model used in the Internet, etc. Additionally, as a network/server equipment managing method, the SNMP communication protocol is commonly used. FIGS. 1A and 1B show the equipment management system using SNMP. In the management system using SNMP, as shown in FIG. 1A, an administrator (an SNMP manager) can request to obtain or set a value for the management information (example: memory size/disk capacity, etc.) about each to be managed (an SNMP agent) The SNMP agent returns to the SNMP manager a reply to the request by referring to a management information database. Furthermore, as shown in FIG. 1B, SNMP has a function that an SNMP agent asynchronously transmits an event and error contents occurred in the SNMP agent to the SNMP manager using a message named SNMP trap. The SNMP manager uses the above-mentioned facilities to manage a node.

SNMP uses the above-mentioned UDP as a lower protocol (the transport layer) during communications between a manager and an agent. Since UDP does not control a flow or establish a connection unlike TCP, there is an advantage of realizing high-speed protocol processing. However, since, unlike TCP, UDP has no error correction facilities or retransmission facilities, it has the disadvantage of no guarantee for data attainment. Therefore, although the trap information asynchronously transmitted from an agent has been lost on the communication line by any trouble, there is the possibility that the manager and the agent cannot detect the loss.

As one of the methods for compensating for the above-mentioned disadvantages, a method for compensating for the loss of the trap information by providing two managers as described in the following patent document 1, receiving by the two managers the trap information generated by the agent, and performing communications between the two managers (socket communications of connection type) although trap information has been lost on the communication line. FIG. 2 shows the system configuration and the configuration of the function in the manager in this method. In FIG. 2, to confirm the loss of trap information between the two managers, the process of establishing a connection, etc. is performed first to communicate data between the two managers. When a trap is transmitted from the agent, the trap receiving facilities in the manager receive the trap, and transmit a result to the data storing facilities. The data storing facilities receive data transmitted from the trap receiving facilities and store the data. Then, retrieved data is transmitted to the retrieving facilities of the other manager. The retrieving facilities of the other manager compare the retrieval condition data transmitted from the data storing facilities with its own data and perform retrieval. Afterwards, the retrieval result is transmitted to the result receiving facilities of the manager of the receiver of the retrieval condition and to the result receiving facilities of the manager. The result receiving facilities transmit an output message to the message output facilities when the result is negative based on the retrieval result transmitted from the retrieving facilities of each manager. The message output facilities display the output message transmitted from the result receiving facilities. Thus, the loss of trap information can be confirmed.

However, as described above, the two managers have various complicated facilities such as retrieving facilities in addition to the trap receiving facilities, and use the socket communications of connection type in communicating with a partner manager. Therefore, it is necessary to establish a connection, etc. as an advance preparation for actual communications. Thus, the processing speed of a program is reduced, and the lost trap information cannot be quickly detected. In some cases, there is a high probability that a bug is caused by complicated processes. As a result, there is the possibility that lost trap information cannot be detected. In the conventional method, it is necessary to provide two managers having the same facilities, which causes the problem of the cost of the equipment to be purchased and implemented, the space required for the equipment to be mounted, etc.

The following patent document 2 describes the connection of a data processing device (manager) for managing an agent and a plurality of agents through a plurality of transmission lines to obtain the reliability of the network management system managed by the SNMP protocol, the detection of a loss of a message by checking the sequence number of a trap message from an agent, and the request for the retransmission of a message.

However, the plurality of transmission lines described in the patent document 2 are used as active or standby transmission lines, and when there is a lost number in a trap message transmitted through a active transmission line, a request is to be issued for retransmission of the trap message of the number, which causes the problem of late message transmission due to the load of the process and the retransmission of the request.

As with the equipment management system using the SNMP, when data is asynchronously transmitted from a transmitter to a receiver using the UDP, the cost for taking action against the loss of communication data is required, thereby also causing a process load to the receiver.

[Patent Document 1] Japanese Published Patent Application No. 2001-67291
[Patent Document 2] Japanese Published Patent Application No. 2000-69119

SUMMARY OF THE INVENTION

The present invention aims at providing a communication system capable of performing smooth communication using UDP at a low cost without a heavy load to a receiver such as a manager, etc. or without losing communication data.

To attain the above-mentioned objective, the present invention includes multiple communication lines at each transmitter and receiver, each transmitter transmits communication data in parallel to the receiver through the multiple communication lines.

Thus, the possibility of losing communication data can be practically reduced to zero, and a part of data transmitted in parallel through the multiple communication lines is only compared to manage the communication information without excess or deficit.

BRIEF DESCRIPTION OF THE DRAWINGS

FIG. 1A shows the case in which an SNMP agent returns a reply to a request from an SNMP manager, and FIG. 1B shows the case in which an SNMP agent asynchronously transmits a trap to an SNMP manager;

FIG. 3 is an explanatory view showing the principle of the present invention;

FIG. 4 is an explanatory view showing an example of the configuration of the management system using SNMP to which the present invention is applied;

FIG. 5 is an explanatory view showing the configuration of the manager according to an embodiment of the present invention;

FIG. 6 is an explanatory view of the SNMP trap message;

FIG. 7 is an explanatory view showing an example of an operation according to an embodiment of the present invention;

FIG. 8 is an explanatory view showing an example of an operation of comparing event data according to an embodiment of the present invention.

DESCRIPTION OF THE PREFERRED EMBODIMENT

Figure 1:
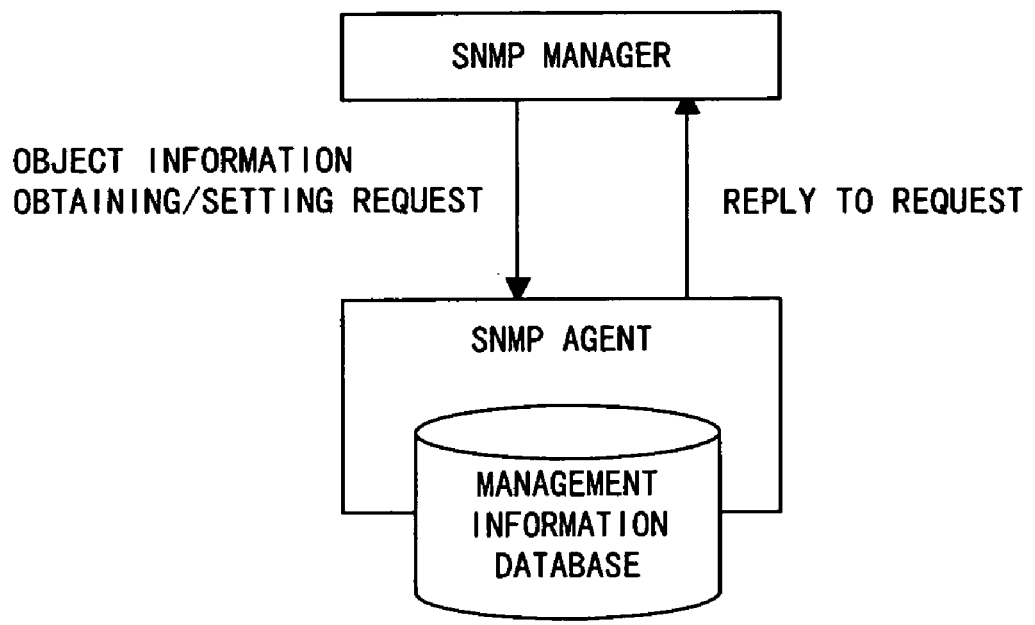
FIGS. 1A and 1B are explanatory views of the equipment management system using SNMP.
Figure 1B:
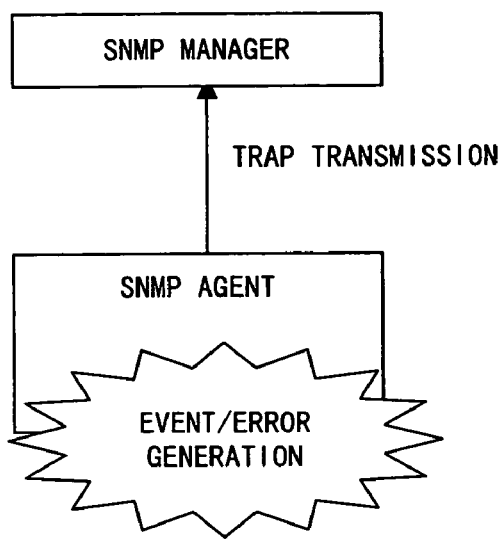
Figure 2:
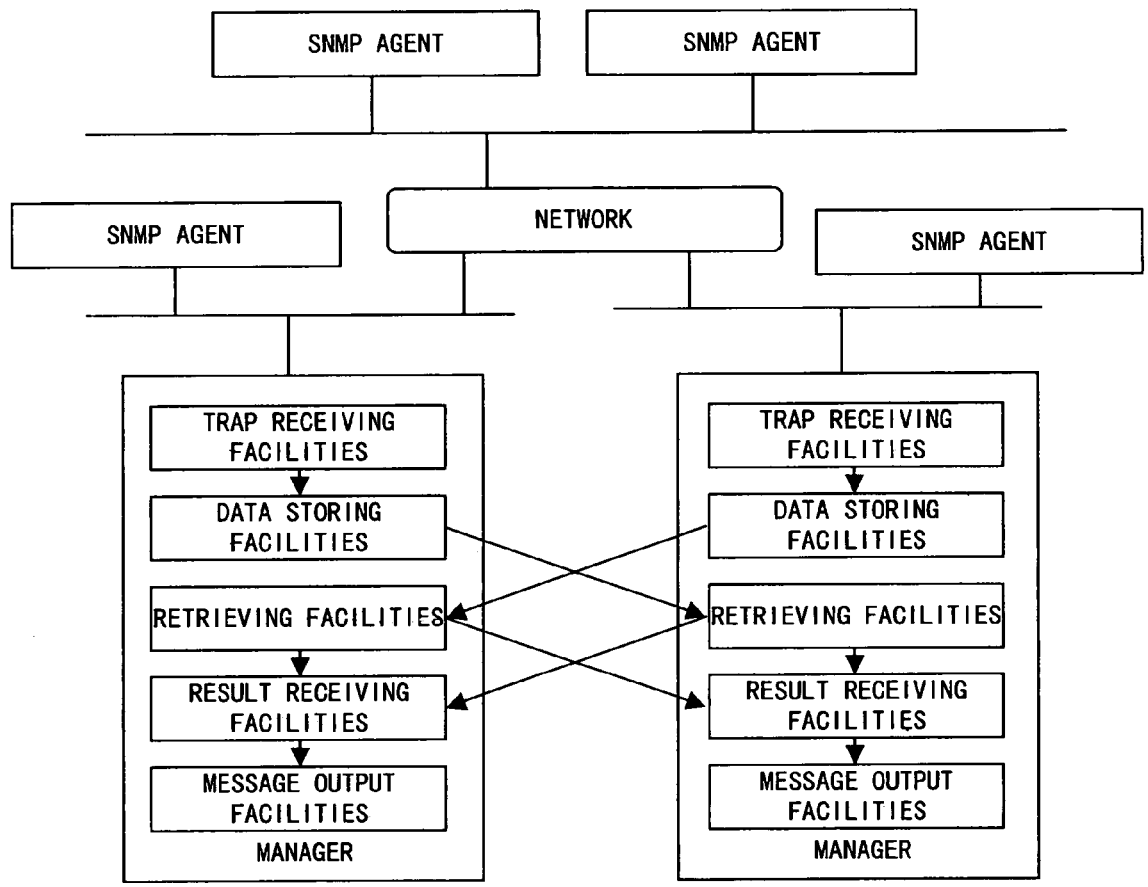
FIG. 2 is an explanatory view of the conventional technology.

FIG. 3 is an explanatory view showing the principle of the present invention, and shows the configuration between a receiver and a transmitter according to the present invention when the number of multiple communication lines is 2. Multiple communication lines are used between a transmitter 20 and a receiver 10, and the transmitter 20 transmits communication data in parallel to the multiple communication lines. The receiver 10 is provided with received data storage queues 11 and 12 for each communication line, and with a received data storage area 14 and a received data identification information comparison unit 13. A part of received data (transmitter identification information/communication data identification information) stored in each queue is compared by the received data identification information comparison unit 13, and the received communication data is stored in the received data storage area 14 without overlap or deficiency. Any information is adoptable as the communication data identification information so far as the communication data can be uniquely identified.

As an embodiment of the present invention, the communication system using UDP according to the present invention is explained below by referring to an equipment management system using SNMP.

FIG. 4 shows an example of the configuration of the management system using SNMP to which the present invention is applied. In the system, an SNMP manager 100 manages a plurality of managed nodes, that is, a server A, a server B, and a server C. In each managed node, an SNMP agent 200 is implemented. Through two communication lines 310 and 320, each SNMP agent 200 is connected to the SNMP manager 100. The SNMP agent 200 generates an SNMP trap according to event/error information generated in each managed node, and transmits trap information to the SNMP manager 100 in parallel.

In the SNMP manager 100, as shown in FIG. 5, there are a trap information reception unit and an event queue for each communication line, and there are also a queue data comparison unit 130 and an event storage area 140. When trap information is transmitted to the SNMP manager 100, each trap information reception unit in the SNMP manager 100 receives the trap information transmitted from one of the communication lines 310 and 320, and the data is stored in each of the event queues 110 and 120. Then the queue data comparison unit 130 compares the trap information stored in each of the event queues 110 and 120. For the comparison of the trap information, identification information (IP address, etc.) of a trap generator, and identification information (occurrence time, sequence number, etc.) of a generated trap are used. These pieces of information are included in the trap information transmitted from the agent. A sequence number identifies the same trap information transmitted in parallel in the multiple communication lines by the agent, and is assigned by the agent.

The trap information is compared with another piece of trap information transmitted from the same agent. First, a trap occurrence time is compared. When occurrence times are different, the information having an older occurrence time is stored in an event storage area. Since the same pieces of trap information are assigned the same occurrence times, the sequence numbers are compared, the information having a smaller sequence number is stored in the event storage area, and the information having a larger sequence number is discarded. By repeating the process on the information stored in an event queue, the trap information transmitted from the agent is stored in the event storage area without excess or deficiency.

FIG. 6 shows the format of the SNMP trap message for transmission of trap information from an agent to a manager. As shown in FIG. 6, the SNMP trap message is formed by Version indicating the version of the SNMP protocol being used, Community indicating the name of a community to be accessed, and PDU (protocol data units) is indicating the data referring to a command of SNMP. A PDU is formed by PDU type ("41" for a trap) indicating the type of the PDU, Enterprise indicating the management enterprise defining a trap, Agent Address indicating the IP address of a trap transmitter, Generic Trap Type and Specific Trap Type indicating the type of trap, Time Stamp indicating the time period from the initialization of an agent to the generation of a trap, and Variable Binding indicating the combination of Name (object ID) and Value.

According to the present invention, for example, assume that an object 1 refers to a trap occurrence time, and an object 2 refers to a sequence number. Then, a trap transmitter sets the trap occurrence time as the value of the object 1, and sets the sequence number as the value of the object 2, thereby transmitting the trap information.

Described below is the operation of embodiments of the present invention. In the example of the configuration of the system management as shown in FIG. 4, for example, as shown in FIG. 7, when four events/errors occur in the server A, the SNMP agent 200 in the server A generates trap information (1)~(4) according to the event/error information, and transmits each piece of information to the SNMP manager 100 through two communication lines A and B in parallel. At this time, if the trap information (3) is lost in the communication line B, then the trap reception unit A in the manager receives trap information (1), (2), (3), and (4), and stores the information in the event queue A. The trap reception unit B receives trap information (1), (2), and (4), and stores them in the event queue B. Afterwards, the queue data comparison unit compares the trap information stored in each queue.

The comparing operation is explained below by referring to FIG. 8. First, the trap occurrence time of the trap (1) stored first in the event queue A is compared with the trap occurrence time of the trap (1) first stored in the event queue B. Since they are the same trap information, the trap occurrence times are also to be the same. If the occurrence times are the same, the sequence numbers are compared, and one having a smaller sequence number is stored in the event storage area. One having a larger sequence number is discarded. The trap (2) are similarly processed. Objects to be compared next are the trap (3) stored in the event queue A and the trap (4) stored in the event queue B. Since they are different trap information, their trap occurrence times are to be different. The trap occurrence times are compared, and the trap having an older time (trap (3)) is stored in the event storage area. The trap having a newer time (trap (4)) is held. Finally, the trap (4) in the event queue A is compared with the held trap (4) in the event queue B. Since these pieces of information have the same occurrence times, the information having a smaller sequence number is stored in the event storage area, and the information having a larger sequence number is discarded.

In the above-mentioned process, the trap information transmitted from an agent can be stored in the event storage area without overlap or deficiency.

Figure 9:
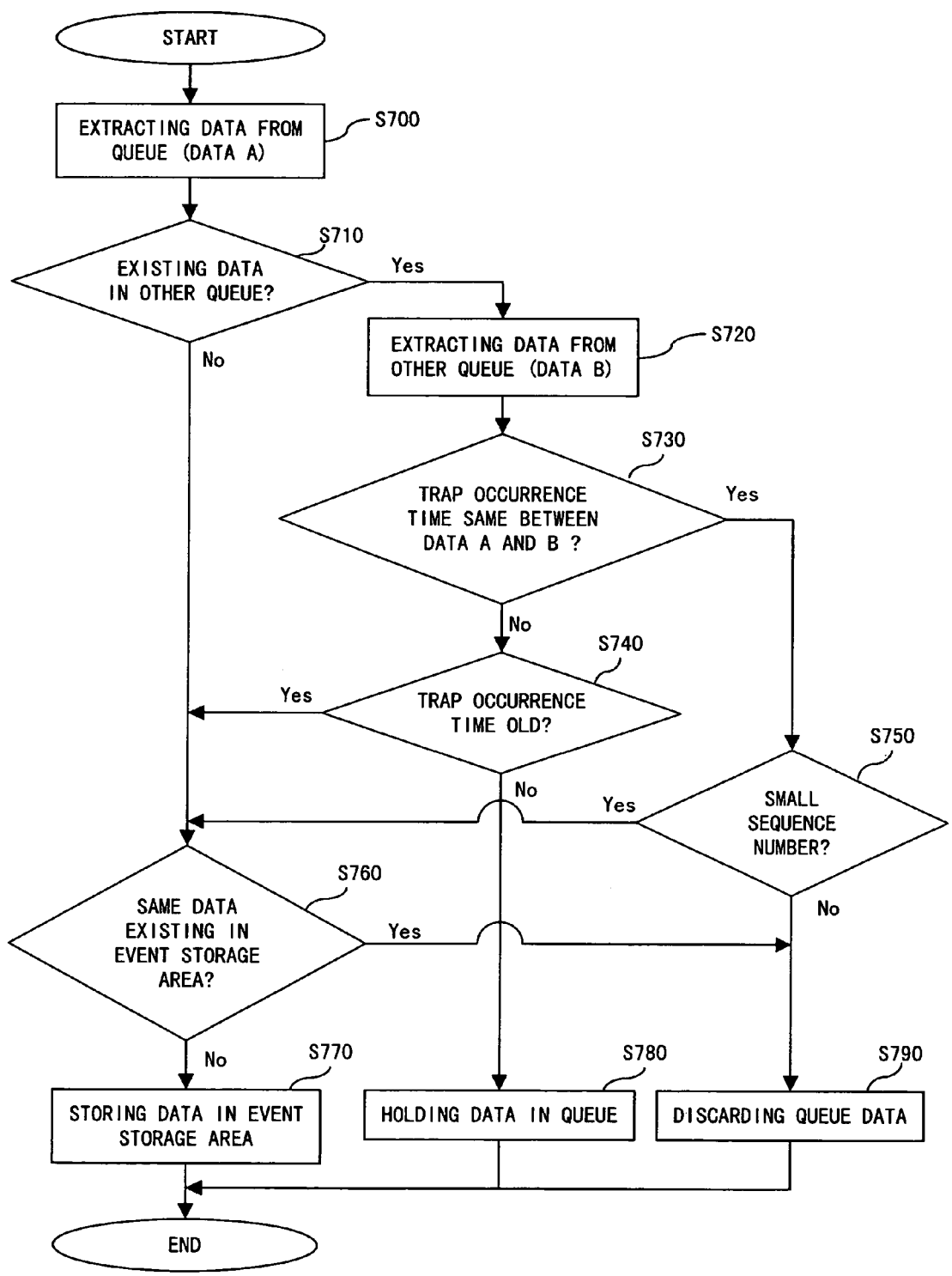
FIG. 9 is an explanatory view showing a flow of storage control of event data according to an embodiment of the present invention.

FIG. 9 shows the sequence of the above-mentioned process. The process described by referring to FIG. 9 is activated by receiving trap information and storing it in an event queue.

In step S700, the leading data (data A) is extracted from one event queue functioning as a trigger of the process activation. In step S710, it is determined whether or not the other event queue contains data. If the other event queue has no data, control is passed to step S760. If there is data in the other event queue, the leading data (data B) is extracted in step S720, and it is determined in the next step S730 whether or not the trap occurrence times of the data A and B are the same.

If they are the same, the sequence numbers are compared in step S750, and as for the data having a smaller sequence number, it goes to the determining process in step S760. The data having a larger sequence number is passed to step S790, and is discarded.

If it is determined in step S730 that trap occurrence times are different, control is passed to step S 740, and the data having an older trap occurrence time is determined in step S760. The data having a newer trap occurrence time is passed to step S780, and is held in its event queue.

In step S760, it is determined whether there is the same data in the event storage area as is extracted from the event queue and is transmitted for the determining process in step S760. If there is already the same data in the event storage area, the data extracted from the event queue is discarded in step S790. If there is not the same data in the event storage area, the data extracted from the event queue is stored in the event storage area (S770).

In the above-mentioned embodiment, the number of communication lines is 2. However, when the reliability of the communication data reception is to be enhanced, it is also possible to increase the multiple communication lines between the transmitter and the receiver. In this case, since the number of the received data storage queues and the number of comparison frequency increase only, the same logic holds.

As described above, according to the present invention, the reliability against the communication data loss in the communication line can be enhanced by increasing the communication lines between the transmitter and the receiver, and storing the received information without overlap or deficiency in the receiver. Therefore, relating to the equipment management system using SNMP, as compared with the conventional method, it is not necessary to perform a complicated process such as the process of establishing communications between managers, etc. Therefore, the number of steps of the program is small, and a simple logic can be used.

As a result, the process speed can be increased, and the trap information from an agent can be quickly and steadily received. Furthermore, since one manager unit can be used, the conventional problems of the purchase cost of equipment and the necessary space can be reduced.

The above-mentioned explanation goes that a communication system using UDP first exists, and then its communication line is made multiple. However, the present invention is not limited to this application. That is, in a system which has multiple communication lines, and using TCP as a lower protocol in asynchronous message notification such as the trap transmission from an SNMP agent, UDP can replace TCP to realize a system applied the present invention.

Furthermore, the processes of the transmitter, the receiver, the SNMP manager, etc. can be realized by the program processing of a computer.

What is claimed is:

1. A communication system including a receiver and a transmitter, the transmitter adding binding information to communication data and transmitting the communication data respectively via multiple communication lines to the receiver, the receiver comprising:
    a plurality of data storage queues provided for each communication line of the multiple communication lines, that respectively receive and store the communication data transmitted from the transmitter via each communication line;
    a data identification information comparison unit that compares the communication data from the transmitter respectively stored in each data storage queue, wherein a trap occurrence time information identifying a time that a trap occurred is included in the binding information, and wherein the data identification comparison unit selects one of the communication data stored in the plurality of the data storage queues based on a sequential number for identifying communication data when compared data includes a same trap occurrence time information in the binding information, and that selects one of the communication data stored in the plurality of storage queues based on trap occurrence time information when compared data includes different trap occurrence data in the binding information; and
    a data storage area that stores the one of the communication data selected by the data identification information comparison unit, wherein
    when the trap occurrence time information of plural data are different, data having a newer trap occurrence time is held in a data storage queue, while data having an older trap occurrence time extracted from the data storage queue is discarded when data identical to data extracted from the data storage queue exists in the data storage area and data having an older trap occurrence time extracted from the data storage queue is stored into the event data storage area when data identical to data extracted from the data storage queue is not stored in the data storage area.

2. The communication system according to claim 1, wherein
    the communication data is asynchronously transmitted from the transmitter to the receiver.

3. A method for transmitting and receiving communication data of a communication system including a receiver and a transmitter connected via multiple communication lines, the method comprising:
    adding binding information that includes trap occurrence time information indicating an occurrence time of a trap to the communication data;

transmitting the communication data respectively via the multiple communication lines;

receiving the communication data transmitted respectively via each communication line;

storing the received communication data respectively in a data storage queue provided for each communication line;

comparing the communication data from the transmitter respectively stored in each data storage queue;

selecting one of the communication data stored in the plurality of the storage queues based on a sequential number for identifying communication data when the compared communication data includes a same trap occurrence time information in the binding information, and selecting one of the communication data based on trap occurrence data when the compared communication data includes different trap occurrence time information in the binding information; and storing selected communication data in a data storage area, wherein when the trap occurrence time information of plural data are different, data having a newer trap occurrence time is held in a data storage queue, while data having an older trap occurrence time extracted from the data storage queue is discarded when data identical to data extracted from the data storage queue exists in the data storage area and data having an older trap occurrence time extracted from the data storage queue is stored into the event data storage area when data identical to data extracted from the data storage queue is not stored in the data storage area.

4. A non-transitory computer-readable record medium storing a program for a computer to realize a communication data receiving method performed by a receiver connecting to a transmitter, the transmitter adding binding information that includes trap occurrence time information indicating an occurrence time of a trap to communication data and transmitting the communication data respectively via multiple communication lines to the receiver, the method comprising:

receiving the communication data transmitted respectively via each communication line;

storing the received communication data respectively in a data storage queue provided for each communication line;

comparing the communication data from the transmitter respectively stored in each data storage queue;

selecting one of the communication data stored in the plurality of the data storage queues based on a sequential number for identifying communication data when the compared communication data includes a same trap occurrence time information in the binding information, and selecting one of the communication data based on trap occurrence data when the compared communication data includes different trap occurrence time information in the binding information; and storing the selected communication data in a data storage area, wherein when the trap occurrence time information of plural data are different, data having a newer trap occurrence time is held in a data storage queue, while data having an older trap occurrence time extracted from the data storage queue is discarded when data identical to data extracted from the data storage queue exists in the data storage area and data having an older trap occurrence time extracted from the data storage queue is stored into the data storage area when data identical to data extracted from the data storage queue is not stored in the data storage area.

5. An equipment management system including an agent and a manager using SNMP protocol for reporting an event/error occurring in the agent, the agent adding binding information to at least one SNMP trap message and transmitting at least one SNMP trap message respectively via multiple communication lines to the manager, the manager comprising:

a plurality of data storage queues provided for each communication line of the multiple communication lines, that respectively receives and stores at least one SNMP trap message transmitted from the transmitter via each communication line;

a data identification information comparison unit that compares at least one SNMP trap message from the agent respectively stored in each data storage queue, wherein a trap occurrence time information identifying a time that a trap occurred is included in the binding information, and wherein the data identification information comparison unit selects one of the SNMP trap messages stored in the plurality of the data storage queues based on a sequential number for identifying one of the SNMP trap messages in the case when compared data includes a same trap occurrence time information in the binding information, and that selects one of the SNMP trap messages stored in the plurality of data storage queues based on trap occurrence time information in the case when compared data includes different trap occurrence data in the binding information; and a data storage area that stores the one of the SNMP trap messages selected by the data identification information comparison unit, wherein when it is determined that the trap occurrence time information of plural data are different, data having a newer trap occurrence time is held in a data storage queue, while data having an older trap occurrence time extracted from the data storage queue is discarded when data identical to data extracted from the data storage queue exists in the data storage area and data having an older trap occurrence time extracted from the data storage queue is stored into the event data storage area when data identical to data extracted from the data storage queue is not stored in the event storing area.

6. A method for transmitting and receiving an SNMP trap message of an equipment management system using SNMP protocol including an agent and a manager connected via multiple communication lines, the method comprising:

adding binding information that includes trap occurrence time information indicating an occurrence time of a trap to a SNMP trap message;

transmitting the SNMP trap message respectively via multiple communication lines;

receiving the SNMP trap message transmitted respectively via the multiple communication lines;

storing the received SNMP trap message respectively stored in an event queue provided for each communication line;

comparing the SNMP trap messages from the agent respectively stored in each event queue;

selecting one of the SNMP trap messages stored in the plurality of the event queues based on a sequential number for identifying SNMP trap message when the compared SNMP trap message includes a same trap occurrence time information in the binding information, and selecting one of the SNMP trap messages based on trap occurrence data when the compared SNMP trap message includes different trap occurrence time information in the binding information; and storing the selected one of the SNMP trap messages in an event storage area wherein when the trap occurrence time information of plural data are different, data having a newer trap occurrence time is held in an event queue, while data having an older trap occurrence time extracted from the event queue is discarded when data identical to data extracted from the event queue exists in the event storage area and data having an older trap occurrence time extracted from the event queue is stored into the event storage area when data identical to data extracted from the event queue is not stored in the event storage area.

7. A non-transitory computer-readable record medium storing a program for a computer to realize an SNMP trap message receiving method performed by a manager connecting to an agent, the agent adding binding information that include trap occurrence time information indicating an occurrence time of a trap to the SNMP trap message and transmitting the SNMP trap message respectively via multiple communication lines to the manager, the method comprising:

receiving at least one SNMP trap message transmitted respectively via each multiple communication line;

storing the received at least one SNMP trap message respectively in an event queue provided for each communication line;

comparing at least one SNMP trap message from the agent respectively stored in each event queue;

selecting one of the SNMP trap messages stored in the plurality of the event queues based on a sequential number for identifying a SNMP trap message when the compared SNMP trap message includes a same trap occurrence time information in the binding information, and selecting at least one SNMP trap message based on trap occurrence data when the compared at least one SNMP trap message includes different trap occurrence time information in the binding information; and storing the selected SNMP trap message in an event storage area, wherein when the trap occurrence time information of plural data are different, data having a newer trap occurrence time is held in an event queue, while data having an older trap occurrence time extracted from the event queue is discarded when data identical to data extracted from the event queue exists in the event storage area and data having an older trap occurrence time extracted from the event queue is stored into the event storage area when data identical to data extracted from the event queue is not stored in the event storage area.

* * * * *